United States Patent [19]
Patton

[11] 4,242,856
[45] Jan. 6, 1981

[54] FRUIT HARVESTING ASSEMBLY

[76] Inventor: Franklin C. Patton, 3918 97th Ave. N., Pinellas Park, Fla. 33565

[21] Appl. No.: 51,037

[22] Filed: Jun. 22, 1979

[51] Int. Cl.³ .............................................. A01D 46/24
[52] U.S. Cl. ......................................... 56/339; 56/340
[58] Field of Search ................................. 56/332–340

[56] References Cited

U.S. PATENT DOCUMENTS

| | | | |
|---|---|---|---|
| 132,634 | 10/1872 | Colthar | 56/339 |
| 403,331 | 5/1889 | Craig | 56/339 |
| 598,401 | 2/1898 | Terrill | 56/339 |
| 600,256 | 3/1898 | Cady | 56/340 |
| 626,058 | 5/1899 | Fliegenschmidt | 56/340 |
| 776,961 | 12/1904 | Terry | 56/333 |
| 908,235 | 12/1908 | Frampton | 56/339 |
| 2,900,780 | 8/1959 | Kaiser | 56/339 |

FOREIGN PATENT DOCUMENTS

| | | | |
|---|---|---|---|
| 702331 | 4/1931 | France | 56/339 |
| 92454 | 5/1938 | Sweden | 56/339 |
| 913562 | 12/1962 | United Kingdom | 56/339 |

*Primary Examiner*—Paul J. Hirsch
*Attorney, Agent, or Firm*—Arthur W. Fisher, III

[57] ABSTRACT

A fruit harvesting assembly of the type including an elongated handle used to cut and collect fruit hanging from trees at a substantial distance above ground. A support frame comprises a base portion attached to the handle means and a head portion having a cutting blade secured thereto. A base portion and head portion are specifically aligned substantially colinear to the longitudinal axis of the handle means wherein the cutting blade and support arms of the support frame are arranged in an angular declining relation to this linear alignment thereby allowing simultaneous positioning of the cutting blade transverse or substantially perpendicular to the stem of the fruit being cut and the support arm in an out of the way location so as to provide clear viewing of engagement of the cutting blade and the fruit being cut.

7 Claims, 3 Drawing Figures

U.S. Patent     Jan. 6, 1981     4,242,856
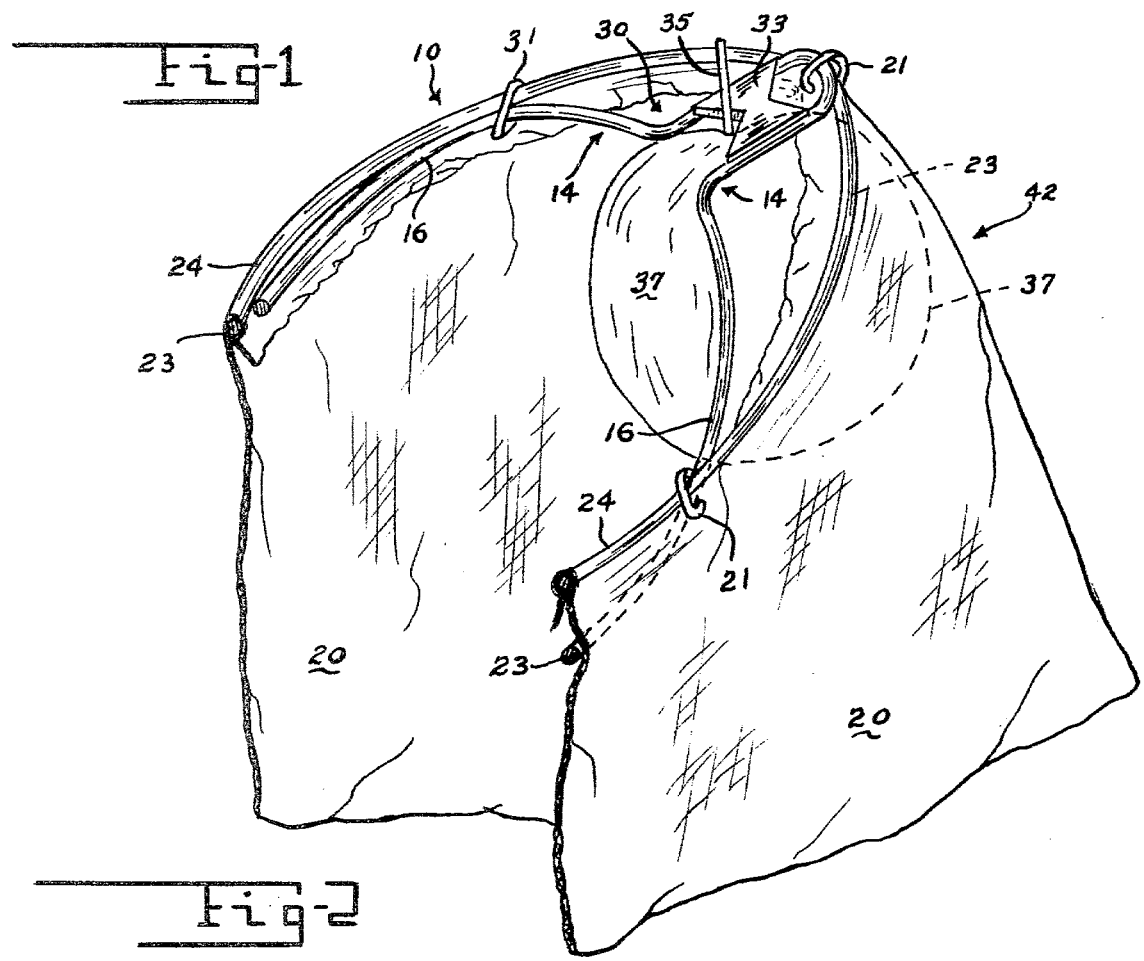
Fig-1
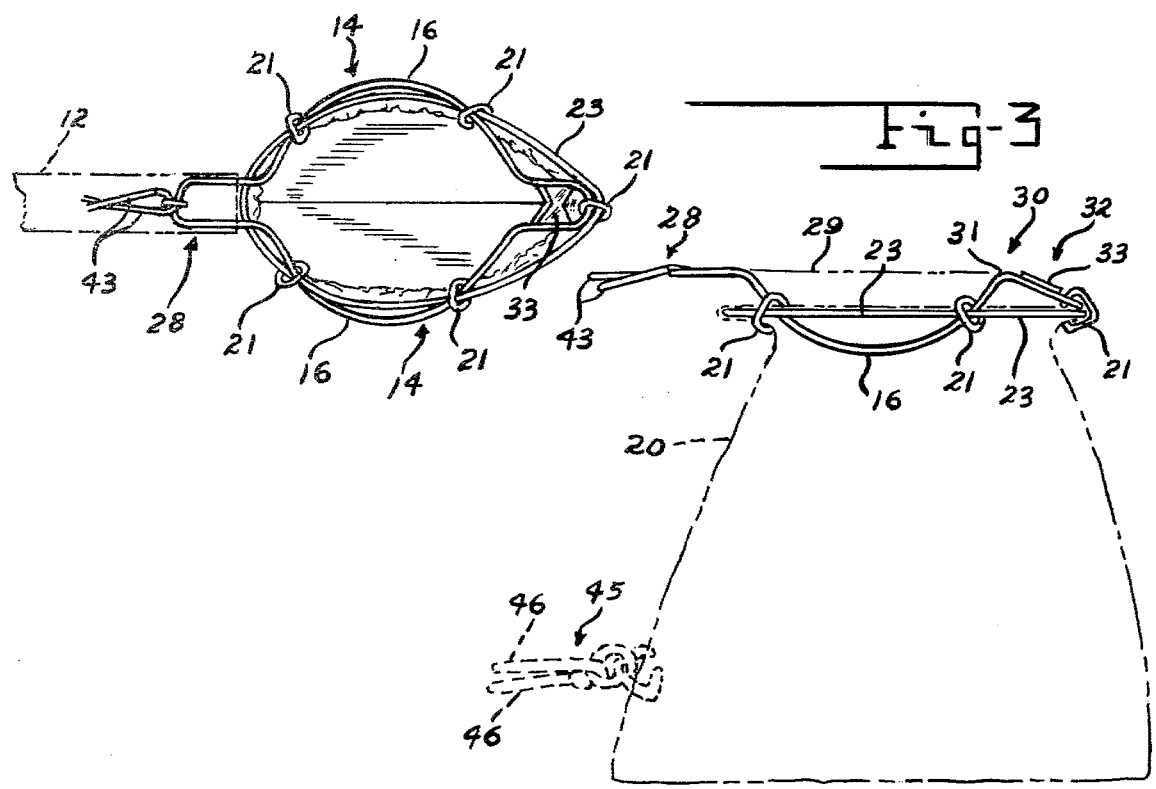
Fig-2
Fig-3

FRUIT HARVESTING ASSEMBLY

BACKGROUND OF THE INVENTION

1. Field of the Invention

This invention relates to a fruit harvesting or picker assembly including a cutting blade particularly oriented relative to the collection bag and support frame therefor so as to allow clear viewing of the cutting action by the operator of the assembly concurrent to the fruit being delivered into the collection bag.

2. Description of the Prior Art

Numerous fruit pickers or harvesting devices of the type used to pick fruit of the type growing on trees a sufficient distance above the ground, are well known in the prior art. Typically, such devices involve an elongated handle or pole used to position a collection bag beneath or in receiving position relative to a piece of fruit or produce being cut. A blade or cutting device is generally secured to the collection facility or support frame thereon in a manner to cut the stem so as to allow dropping of the cut fruit into the collection facility.

Problems generally associated with devices of this type include the inability of the operator to observe the actual cutting action. This is due to the fact that the construction of the assembly generally has not been properly designed to allow the operator to observe the actual cutting contact of the cutting facility with the stem of the fruit being cut.

Accordingly, the fruit is frequently damaged and the cutting action is generally not carried out in an efficient manner. There is an obvious need in the industry for a device which allows the observation of the cutting action by the operator simultaneously to obtaining efficient collection of the fruit being cut without damage thereto. Such desirable performance characteristics, which overcome existing problems in prior art devices should be accomplished by efficient design of the overall harvesting assembly in a manner which would properly position the various components thereof to perform the cutting and collecting actions in the intended fashion.

In addition, such device should be of simple construction so as to have a long operative life.

SUMMARY OF THE INVENTION

This invention is directed towards a fruit harvesting or picker assembly of the type used to remove fruit from trees wherein the fruit grows a sufficient distance above ground. The assembly of the present invention is used with a handle means having a generally elongated configuration generally in the form of a pole or rod manipulated by the operator of the assembly to position a collection facility such as a bag or like beneath the item of fruit or produce being cut. The collection bag has a mouth or access opening having its periphery supported by a support frame. The support frame itself is fixedly attached to the handle means at the distal end thereof and is specifically structured to include a base portion and a head portion. The base portion is shaped and structured to be affixedly attached to the distal end of the handle means and the head portion is disposed in spaced apart relation thereto.

An important feature of the present invention is the linear alignment of the head portion, base portion and the colinear disposition of this linear alignment with the longitudinal axis of the handle means.

The support frame means further includes a pair of support arm means each extending in interconnecting relation between the base portion and the head portion. Each support arm means further include a substantially curvilinear outwardly bowed arcuate configuration specifically structured to support the periphery of the collection bag in a manner which will readily receive the fruit being cut after separation from the supporting tree.

A cutting means including a cutting blade is secured to the head portion of the support frame means and is angularly disposed relative to the linear alignment between the head portion and the base portion so as to allow proper predetermined positioning of the cutting blade relative to the stem of the fruit being cut. More particularly the cutting blade is disposed in angular declining relation to the aforementioned linear alignment so as to allow its transverse positioning relative to the stem being cut during the cutting action.

In addition, the two support arm means are also disposed in what may be considered angularly declining planes, angularly positioned relative to one another, the declining position of the cutting means, and the linear alignment of the head portion and the base portion as set forth above.

The relative dispositions of the support arm means and the cutting means to the linear alignment of the head portion and base portion allows a clear viewing of the cutting action and the cutting engagement of the cutting blade relative to the stem being cut.

Another structural feature of the present invention includes the support in interconnected relation between the collection bag and the support frame means in a manner which will serve to form a "pocket" to surround and at least partially support the fruit product immediately prior to and concurrent to its being cut by interaction of the cutting blade and the stem of the fruit.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a perspective view in partial cutaway showing the cutting of a fruit product by the blade portion of the fruit harvesting assembly.

FIG. 2 is a top view of the fruit harvesting assembly.

FIG. 3 is a side view of the fruit harvesting assembly.

Similar reference characters refer to similar parts throughout the several views of the drawings.

DETAILED DESCRIPTION OF THE PREFERRED EMBODIMENT

As shown in FIGS. 1, 2 and 3 the subject invention relates to a fruit harvesting assembly generally indicated as 10 and being of the type used with a substantially elongated handle 12 affixed to a support frame means generally indicated as 14. The support frame means includes a pair of support arms 16 having a substantially arcuate and/or curvilinear configuration and being disposed in spaced apart relation so as to define a mouth or access means 18 allowing entry into the collection bag 20. A plurality of connector elements 21 serve to support the collection bag 20 by being supportedly mounted on the support frame means 14 about the length of the arms 16, etc. The individual connector elements 21 further are secured to a mounting frame 23 affixed on the interior and about the actual periphery 24 of the collection bag 20.

The support frame means 14 further comprises a base portion generally indicated as 28 and a head portion generally indicated as 30. More specifically the head portion includes an outwardly projecting crown 31 which, in the preferred embodiment and comprising an important structural feature of the present invention, is disposed in substantially linear alignment with the base means 28. Further, this linear alignment is defined by extending along longitudinal axis of the handle means 12. For purposes of clarification the linear alignment is further defined by an imaginary line (FIG. 3) indicated as 29.

To the contrary the support arms 16 disposed on opposite sides of the imaginary line 29 and defined linear alignment are arranged in a downwardly declining relation to the linear alignment. Further, the structure comprises a cutting means generally indicated as 32 in the form of a blade element 33. The blade element is further mounted on what may considered the head portion area of the support frame and is specifically disposed also in a downwardly declining angular orientation to the linear alignment between the head portion or crown 31 and the base means 28.

By virtue of the relative angular orientation between each of the support arms 16, the cutting means 32 including the blade element 33, all being angularly oriented relative to the linear alignment of the head means 30 and base means 28, a clear cutting view and action can be accomplished through the structure of the present invention.

More specifically the cutting blade 33 may be arranged in what could be considered a transverse or substantially perpendicular relation to the stem 35 of the fruit being cut. This occurs concurrently to the actual fruit product indicated as 37 being held snuggly within a pocket like area or portion of a collection bag 20 immediately beneath the head means 30 and the cutting means and blade element 33 (see FIG. 1). For purposes of clarification the pocket is generally represented on the exterior of the collecting bag 20 as 42.

Therefore, the downward manipulation of the elongated handle 12 serves the purpose of bringing the blade element 33 into transverse or perpendicular cutting relation to the stem 35 while at the same time lowering the remaining portions of the base means 28 and the outwardly and downwardly extending arcuate support arm 16 out of vision interrupting engagement with this cutting action relative to an operator or holder of the handle 12.

The base means 28 further includes connecting fingers or extensions 43 integrally formed or connected thereto so as to insure proper securement to a distal end of the handle 12 as best shown in FIG. 2. It is obvious that the extensions 43 may take a number of varied configurations any of which would be applicable for proper securement to the handle 12.

A stabilizing means generally indicated as 45 is provided in the form of elongated cords 46 which may be attached about the handle 12 in a tied or otherwise secured fashion so as to prevent the inadvertent displacement of the collection bag 20 from a clear position for receiving the fruit or produce products 37 from falling into the interior thereof.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language might be said to fall therebetween.

Now that the invention has been described, what is claimed is:

1. A fruit harvesting assembly of the type primarily designed to cut and collect fruit located at an above ground position, said assembly comprising: handle means, support frame means secured to said handle means and including a base portion and a head portion disposed in spaced apart, linearly aligned relation to one another and to the longitudinal axis of said handle means, said support frame means comprising two support arm means each disposed in spaced apart relation to one another and interconnected relation between said head portion and said base portion, said support arm means are cooperatively positioned to define an entrance to said assembly, each support arm means disposed to define a plane angularly oriented to one another and to the linear alignment of said base portion, head portion and longitudinal axis of said handle means, each said support arm means includes an arcuately, substantially outwardly bowed, curvilinear relation to one another so as to define said entrance to said assembly through which fruit passes after being cut; cutting means secured to said head portion and disposed in predetermined angular orientation to the linear alignment of said head portion, base portion and longitudinal axis of said handle means, said cutting means comprises a blade element disposed in an angular depending relation to said linear alignment of said base portion, head portion and the longitudinal axis of said handle means, each support arm means angularly oriented in depending declined relation to said linear alignment and said blade element, said angular oriented cutting means disposable in a cutting position substantially defined by a transverse relation to the stem of the fruit being cut while said linear aligned head portion and base portion are depending therefrom in declined relation to the cutting plane of said cutting means, whereby a clear view of the fruit being cut is available to the operator of said assembly.

2. A fruit harvesting assembly as in claim 1 wherein said blade element is disposed in substantially transverse relation to the stem of the fruit being cut concurrently to the angular depending relation of said linear alignment.

3. A fruit harvesting assembly as in claim 1 further comprising a collecting bag connected about the periphery of its opening to said support frame means along the length of each support arm means.

4. A fruit harvesting assembly as in claim 3 further comprising mounting frame means including a substantially annular configuration disposed in supporting, at least partially covered relation to the periphery of the access opening of said collection bag, said mounting frame means disposed is secured, supported relation to said support frame means.

5. A fruit harvesting assembly as in claim 4 further comprising a plurality of connector elements disposed in interconnecting relation between said support arm means and said mounting frame means.

6. A fruit harvesting assembly as in claim 5 wherein said support arm means is disposed relative to said head and base portion so as to position said head and base portion in outwardly protruding relation above the plane of said mounting frame means.

7. A fruit harvesting assembly as in claim 6 further comprising stabilizing means attached to a lower portion of said collection bag and removably secured to said support frame means and said handle means whereby said collection bag is maintained in fruit receiving position during cutting action.

* * * * *